United States Patent Office 3,786,053
Patented Jan. 15, 1974

3,786,053
PROPIONAMIDO TRIAZINE
Trevor Chapman, Sittingbourne, England, and Werner Schwarze, Frankfurt, and Wolfgang Weigert, Offenbach, Germany, assignors to Deutsche Gold- und Silber-Scheideanstalt vormals Roessler, Frankfurt am Main, Germany
No Drawing. Filed Sept. 7, 1971, Ser. No. 178,411
Int. Cl. C07d 55/20
U.S. Cl. 260—249.8      14 Claims

ABSTRACT OF THE DISCLOSURE

Triazines of the formula:

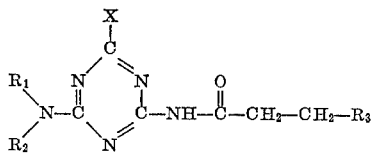

wherein X is a lower straight or branched chain alkyl mercapto, a lower alkoxy, benzyl mercapto or phenyl mercapto; $R_1$ and $R_2$ are the same or different and are selected from hydrogen, benzyl, cyclohexyl, a lower straight or branched chain alkyl which is unsubstituted or substituted by —OH, —OR, —SR, benzyl, and —CN wherein R is a lower alkyl and wherein $R_1$ and $R_2$ may be open or closed with one another to form a 5 or 6 membered ring with or without an oxygen atom presented in the ring; and $R_3$ is hydrogen, a lower straight or branched chain alkyl mercapto, or a lower alkoxy; have been found to influence the growth of plants and in many instances may be used as herbicides.

---

This invention relates to compounds for influencing plant growth and compositions made therefrom. More particularly, this invention relates to propionamido triazines and compositions made therefrom which are useful particularly as herbicides.

Substituted s-triazines (i.e. s- means symmetrical) of the general formula:

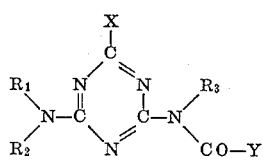

are known in which X is for example a halogen atom or $CCl_3$ and $R_1$ to $R_3$ are a hydrogen atom or an alkyl radical. Compounds of this type, in which Y is a chlorine atom, do not of themselves exhibit any significant pesticidal activity. They can be used, however, as intermediates for the production of diuretics, fungicides and insecticides as set forth in, for example, German Pats. 1,149,718 and 1,162,843. Compounds of this same general type but in which Y is an alkyl amino group do exhibit herbicidal properties as illustrated by reference to U.S. Pats. 3,120,468 and 3,137,695. Thus it can be seen that the substituted s-triazines are generally unpredictable as to their ability to exhibit activity for influencing the growth of plants and particularly herbicidal activity.

The subject invention is based upon the unexpected finding that certain novel substituted s-triazines of the propionamide type exhibit significant activity for influencing the growth of plants and in most instances exhibit significant herbicidal activity. These unique and novel propionamido triazines, as contemplated by this invention, are represented by the general formula:

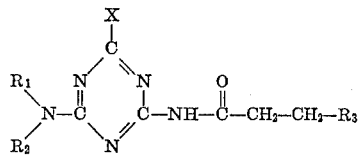

wherein X is a lower straight or branched chain alkyl mercapto, a lower alkoxy, benzyl mercapto or phenyl mercapto, $R_1$ and $R_2$ are the same or different and are selected from hydrogen, benzyl, cyclohexyl, a lower straight or branched chain alkyl which is unsubstituted or substituted by —OH, —OR, —SR, benzyl, and —CN wherein R is a lower alkyl and wherein $R_1$ and $R_2$ may be open or closed with one another to form a 5 or 6 membered ring with or without an oxygen atom presented in the ring; and $R_3$ is hydrogen, a lower straight or branched chain alkyl mercapto, or a lower alkoxy.

The term "lower" is used herein in accordance with its conventional meaning in the art. That is to say this term is used to denote an alkyl or alkoxy group having from 1–4 carbon atoms.

The above-described compounds of this invention exhibit plant-growth influencing characteristics and are therefore useful either alone or in combination with other ingredients to influence, in a variety of ways, the growth of plants particularly as herbicides either of the pre or post emergence type. For example, many of the compounds of this invention are particularly suitable as post or pre emergence herbicides for selectively combating weeds such as Echinochloa crus-galli while allowing the desired crop, i.e. rice, to grow relatively uninhibited. In other instances some of the compounds of this invention are broad-spectrum herbicides effective for complete killing and prevention of undesirable plant growth. In still other instances, some of the compounds of this invention only need be employed in very small amounts to effect their desired results. In still further instances, many of the compounds of this invention may serve as defoliants, or to delay flowering or even to decrease the beginning of the development of a plant's fruit. The type activity of the compounds of this invention is usually governed by the types of substituents X, $R_1$, $R_2$ and/or $R_3$ represent. These substituents also play an important role in obtaining compounds which may be employed in only small amounts to achieve their desired results.

The compounds of this invention represented by the above-described formula may be used independently or mixed with one another or with other herbicides. They may also be employed in combination with other agricultural products such as insecticides, acaricides, fungicides, fertilizers, and the like. In most instances the compounds of this invention are crystalline in form and are readily soluble in conventional organic solvents such as the known alcohols, ketones, hydrocarbons, halogenated hydrocarbons, examples of which include benzyl chloride and various mineral oils (e.g. diesel oil, vegetable oils and mixtures thereof).

While the compounds of this invention may be employed alone or in conventional spray form etc., it is often desirable to employ them in combination with conventional solid inert carriers such as clay, kaolin, kieselgur, bentonite, talcum, finely ground calcium carbonate, charcoal, woodmeal and the like. This may be accomplished by mixing the particulate carrier materials and compounds in dry form or by spraying an emulsion or solution of the compound onto the carrier material and then drying the mixture. Preferable, the compounds are combined with the solid carriers so as to strongly adhere at least to the surface of the carrier particles. While the weight percent of carrier and compound may vary widely, it is generally preferred to use them in an amount of about 5–95% by weight compound to about 5–95% by weight carrier.

In order to achieve better adhesion of the compound to the carrier particles, conventional adhesives may be employed, examples of which include glue, casein, alginates and the like. Once the carrier is provided with the compound the mixture may be used as a dust (dusting agent) or formed into a spray by slurrying or suspending the particles in a liquid medium (e.g. water), for example, by merely mixing them with water or by reworking the particles such as by further grinding and/or forming a paste thereof, and then mixing them with water. If a suspension is to be formed then it is often desirable to employ one or more conventional suspension agents (e.g. wetting agents and emulsifiers) and/or stabilizers therein.

Examples of conventional wetting agents, emulsifiers, and stabilizers which may be employed include the conventional anionic, cationic and non-ionogeneous substances such as turkey red oil, salts of fatty acids, alkylaryl sulfonates, secondary alkyl sulfates, resinous acid salts, polyethylene oxide ether of fatty alcohols, fatty acids or fatty amines, quaternary ammonium compounds, lignin sulphonic acid, saponine, gelatines, casein, each alone or in admixture with one another.

The compounds of this invention represented by the above formula may be formed by any conventional technique known to those skilled in the art. For example, one may start with the available amino triazines corresponding to the propionamido triazine desired to be formed. These amino triazines may then be reacted with either the chlorides or anhydrites of the corresponding propionic acids or, in the alternative, the amino triazines and corresponding propionic acids (either substituted or unsubstituted) may be formed into a solvent solution and then chlorinated by the addition of a chlorinating agent thereto. The reaction may be carried out at only moderately increased temperatures such as about 40°–80° C. The solvent for such a solvent solution is preferably one of either methyl chloride, 1,2-dichloroethane, chloroform or benzene.

Examples of compounds contemplated by this invention represented by the above-given formula and formulatable by the above-described techniques are enumerated in the following table: They correspond to the general formula:

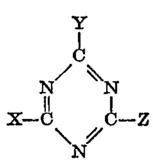

TABLE A

| X | Y | Z | F (° C.) | Appearance |
|---|---|---|---|---|
| $OCH_3$ | $NHC_2H_5$ | $NH\text{-}COC_2H_5$ | 161–162 | White. |
| $OCH_3$ | $NHC_4H_9$-n | $NH—COC_2H_5$ | 135–136 | Do. |
| $OCH_3$ | $NHC_4H_9$-t | $NH—COC_2H_5$ | 130–131 | Do. |
| $SCH_3$ | $NHC_2H_5$ | $NH—CO—C_2H_5$ | 182–183 | Light gray. |
| $SCH_3$ | $NHC_3H_7$-i | $NH—CO—C_2H_5$ | 159–160 | Do. |
| $SCH_3$ | $NHC_4H_9$-i | $NH—CO—C_2H_5$ | 151–152 | White. |
| $SCH_3$ | $NHC_4H_9$-t | $NH—CO—C_2H_5$ | 165–166 | Do. |
| $SCH_3$ | $NHC_6H_{11}$ | $NH—CO—C_2H_5$ | 174 | Bright yellow. |
| $SCH_3$ | $NHC_3H_7$-i | $NH—CO—CH_2CH_2SCH_3$ | 163–164 | Yellow. |
| $SCH_3$ | $NHC_4H_9$-t | $NH—CO—CH_2CH_2SCH_3$ | 123–124 | Bright yellow |
| $SCH_3$ | $NHC_4H_9$-t | $NH—CO—CH_2CH_2OCH_3$ | 143–144 | White. |
| $SC_6H_5$ | $NHC_4H_9$-t | $NH—COC_2H_5$ | 184.5–185.5 | Yellowish brown. |

The following examples are presented by way of illustration rather than limitation. All parts are by weight unless otherwise indicated, and all compositions or compounds produced exhibit significant herbicidal activity.

EXAMPLE 1

10 parts of 2-methylmercapto-4-ethyl amino-6-N-propionamido-s-triazine, 89 parts of bentonite and 1 part of a highly dispersed pyrogenically produced silicic acid, are ground in a ballmill to a fine dust. This mixture can be used as a herbicidal dusting agent.

EXAMPLE 2

A mixture of 2-methoxy-4-t-butyl amino-6-n-propionamido-s-triazine and 90 parts of kieselguhr are ground in a ballmill up to the highest degree of fineness. The resulting product may be used as a herbicidal dusting agent.

EXAMPLE 3

A mixture of 2-methyl mercapto-4-t-butyl amino-6-N-$\beta$-methyl mercapto propionamido-s-triazine, 70 parts of o-dichloro-benzol and 10 parts of an octyl phenyl polyglycol ether from di-t-butyl phenol and 10 to 12 moles ethylene oxide (=Hostapal CV®) is prepared. This preparation with water, results in a stable emulsion.

EXAMPLE 4

25 parts of 2-isopropyl mercapto-4-t-butyl amino-6-N-propionamido-s-triazine is dissolved in 200 parts of cyclohexanol, 15 parts of xylene and 10 parts of a substituted naphthalin disulfonic acid (NekalBX®). The mixture with water results in a stable emulsion.

EXAMPLE 5

50 parts of 2-butyl mercapto-4-i-propylamino-6-N-$\beta$-methoxy propionamido-s-triazine is dissolved in 450 parts of kerosene. The solution may be sprayed immediately.

EXAMPLE 6

18.5 g. of 2-amino-4-ethyl amino-6-methyl mercapto-s-triazine are dissolved in 100 ml. of methylene chloride, 18.5 g. of propionyl chloride are added and is boiled for 6 hours under reflux. This is then evaporated in a vacuum until dry, is dissolved again with methylene chloride and stirred at 10 to 20° C., with 10% sodium lye, whereby enough is added, so that the aqueous solution has a pH value of 7. The aqueous layer is drained off and the methylene layer is dried with $Na_2SO_4$. After evaporating in this vacuum there remain some crystals which are recrystallized immediately from benzene. Bright yellow crystals, F.: 180 to 183° C.; quantity: 20.7 g. of 2-methyl mercapto-4-ethyl amino-6-propionamido-s-triazine, corresponding to 85.5% of theory.

EXAMPLE 7

18.5 g. of 2-methyl mercapto-4-ethyl amino-6-amino-s-triazine are suspended in 150 ml. of chloroform, 16.3 g. of propionic acid and subsequently 26 g. of thionyl chloride are added. This is boiled for 6 hours with reflux, is then evaporated in a vacuum until dry, then absorbed with $CH_2Cl_2$, is neutralized with the diluted (10%) NaOH. The methylene chloride layer is dried and evaporated in the vacuum, the residue is immediately recrystallized from benzene. There is obtained 20.1 g. of 2-methyl mercapto - 4-ethyl amino - 6 - propionamido-s-triazine, corresponding to 83.3% of theory. F.: 182 to 183° C.

EXAMPLE 8

As evidence of the herbicidal effects of several of the compounds of this invention, the following experiments were made: In a hothouse with an inside temperature of 21° C. various seeds were raked into the ground. After sprouting, the aqueous dispersion of the active substance was sprayed on the leaves two weeks after seeding.

In the following table the varieties of plants employed, the characteristics of active substance used per hectare (kg./ha.) as well as the percentages of plants killed are given:

TABLE B

| Compound | 10% | | 50% | | 90% | |
|---|---|---|---|---|---|---|
| | I | II | I | II | I | II |
| Plants: | | | | | | |
| Maize | 1.11 | 0.64 | 4.53 | 3.50 | 10 | 10 |
| Wheat | 0.72 | 0.15 | 1.77 | 0.33 | 4.39 | 1.32 |
| Rice | 0.94 | 0.20 | 3.77 | 0.81 | 10 | 3.25 |
| Echinochla crus-galli, Watergrass | 0.38 | 0.15 | 0.94 | 0.15 | 2.35 | 0.43 |
| Meadow fescue Barnyard grass | 0.5 | 0.17 | 1.43 | 0.45 | 4.09 | 1.27 |
| Meadow foxtail | 0.3 | 0.15 | 0.63 | 0.15 | 1.32 | 0.35 |
| Kale | 0.59 | 0.15 | 1.45 | 0.15 | 3.6 | 0.23 |
| Sugar beet | 0.15 | 0.15 | 0.19 | 0.15 | 0.84 | 0.15 |
| Sunflower | 0.21 | 0.15 | 0.58 | 0.15 | 1.63 | 0.15 |
| Carrot | 0.15 | 0.27 | 0.32 | 1.60 | 1.75 | 9.36 |
| Chycoree | 0.28 | 0.15 | 0.88 | 0.15 | 2.77 | 0.25 |
| Crabgrass | 0.9 | 0.15 | 1.72 | 0.15 | 3.30 | 0.48 |
| Plantain | 0.64 | 0.15 | 1.68 | 0.33 | 3.00 | 3.31 |
| Pigwood | 0.22 | 0.15 | 0.64 | 0.15 | 1.65 | 0.15 |

NOTE.—I=2-ethyl amino-4-methyl mercapto-6-propionamido-s-triazine; II=2-t-butyl amino-4-methyl mercapto-6-propionamido-s-triazine.

EXAMPLE 9

42 g. of 2-methyl mercapto-4-benzyl amino-6-amino triazine is suspended in 100 ml. of methylene chloride and then 34.6 g. of propionyl chloride is added drop by drop while stirring, this is subsequently boiled for 2 hours under reflux. Then it is evaporated in a vacuum until dry, is absorbed with chloroform and neutralized with 10% NaOH while stirring at 20° C. The layer of chloroform is dried and evaporated in the vacuum. Bright yellow crystals of the composition

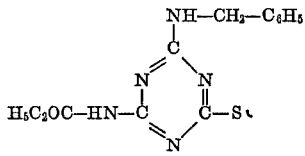

(=2 methyl mercapto-4-benzyl amino-6-propionamido-s-triazine) is obtained. F.: 181 to 182° C. Quantity: 36.4 g.=70.0% of theory. Analysis: Calculated (percent): C, 55.5; H, 5.6; N, 23.1; S, 10.5. Found (percent): C, 55.76; H, 5.6; N, 22.9; S, 10.3.

Once given the above disclosure many other features, modifications, and improvements will become apparent to the skilled artisan Such other features, modifications and improvements are therefore considered a part of this invention, the scope of which is to be determined by the following claims.

We claim:
1. A compound represented by the formula:

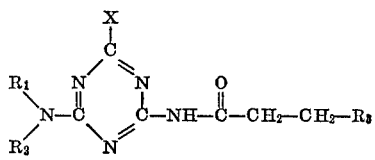

wherein X is a lower straight or branched chain alkyl mercapto, a lower alkoxy, benzyl mercapto or phenyl mercapto; $R_1$ and $R_2$ are the same or different and are selected from hydrogen, benzyl, cyclohexyl, and a lower straight or branched chain alkyl which is unsubstituted or substituted by at least one group selected from —OH, —OR, —SR, -benzyl, and —CN wherein R is a lower alkyl; and $R_3$ is hydrogen, a lower straight or branched chain alkyl mercapto, or a lower alkoxy, said compound exhibiting significant plant growth influencing activity.

2. A compound according to claim 1 wherein $R_1$ is hydrogen, $R_2$ is —$CH_2$—$C_6H_5$, and X is —S—$CH_3$.

3. A compound according to claim 1 wherein X is —$OCH_3$, $R_1$ is hydrogen, $R_2$ is —$C_2H_5$ and $R_3$ is hydrogen.

4. A compound according to claim 1 wherein X is —$OCH_3$, $R_1$ is hydrogen, $R_2$ is —$C_4H_9$-n, and $R_3$ is hydrogen.

5. A compound according to claim 1 wherein X is $OCH_3$, $R_1$ is hydrogen, $R_2$ is —$C_4H_9$-t, and $R_3$ is hydrogen.

6. A compound according to claim 1 wherein X is —$SCH_3$, $R_1$ is hydrogen, $R_2$ is —$C_2H_5$ and $R_3$ is hydrogen.

7. A compound according to claim 1 wherein X is —$SCH_3$, $R_1$ is hydrogen, $R_2$ is —$C_3H_7$-i and $R_3$ is hydrogen.

8. A compound according to claim 1 wherein X is —$SCH_3$, $R_1$ is hydrogen, $R_2$ is —$C_4H_9$-i and $R_3$ is hydrogen.

9. A compound according to claim 1 wherein X is —$SCH_3$, $R_1$ is hydrogen, $R_2$ is —$C_4H_9$-t and $R_3$ is hydrogen.

10. A compound according to claim 1 wherein X is —$SCH_3$, $R_1$ is hydrogen, $R_2$ is —$C_6H_{11}$ and $R_3$ is hydrogen.

11. A compound according to claim 1 wherein X is —$SCH_3$, $R_1$ is hydrogen, $R_2$ is —$C_3H_7$-i, and $R_3$ is —$SCH_3$.

12. A compound according to claim 1 wherein X is —$SCH_3$, $R_1$ is hydrogen, $R_2$ is —$C_4H_9$-t and $R_3$ is $SCH_3$.

13. A compound according to claim 1 wherein X is —$SCH_3$, $R_1$ is hydrogen, $R_2$ is —$C_4H_9$-t and $R_3$ is —$OCH_3$.

14. A compound according to claim 1 wherein X is —$SC_6H_5$, $R_1$ is hydrogen, $R_2$ is —$C_4H_9$-t, and $R_3$ is hydrogen.

References Cited
UNITED STATES PATENTS 3,627,749  12/1971  Ackermann et al. ........ 260—249.8 XR
3,634,423  1/1972  Schwarze et al. ........ 260—249.8

JOHN M. FORD, Primary Examiner

U.S. Cl. X.R.
71—93